INVENTOR.
HANS A. ECKHARDT

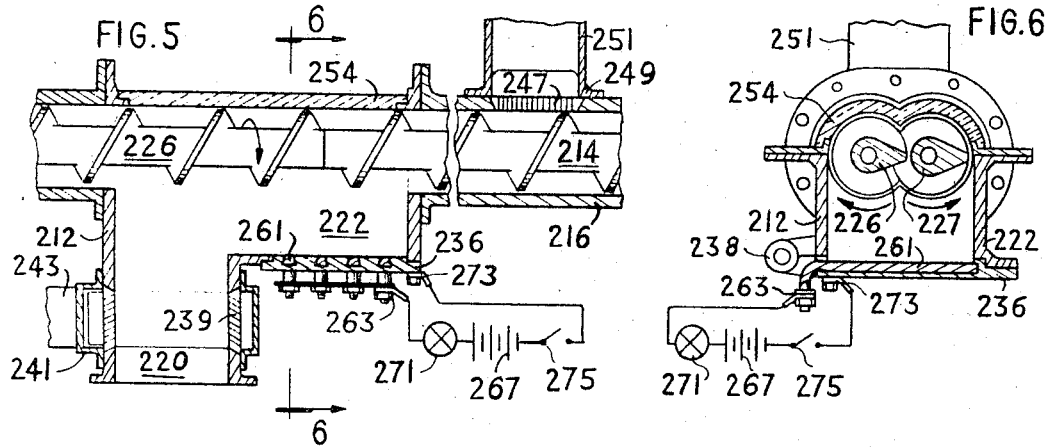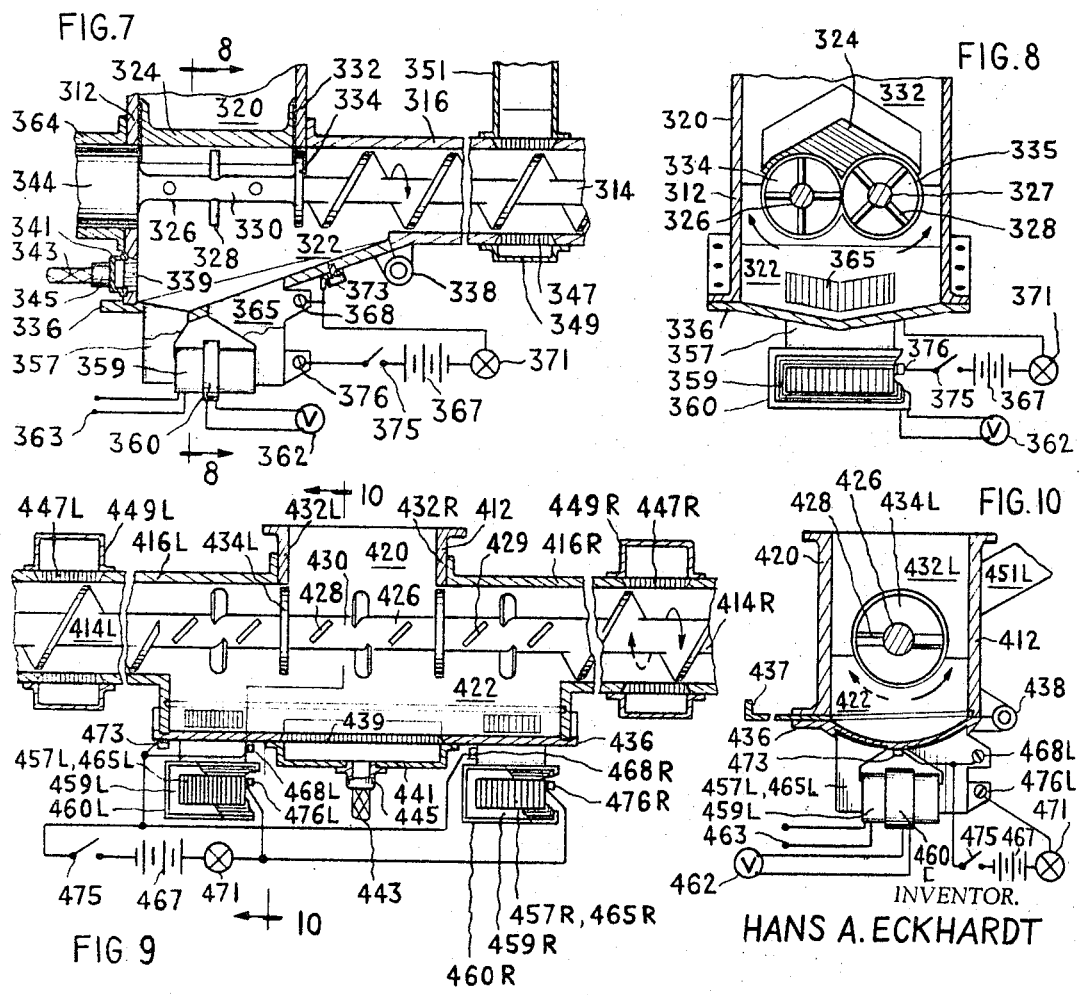

United States Patent Office 3,452,863
Patented July 1, 1969

3,452,863
SCREW CONVEYOR
Hans A. Eckhardt, 55 Crescent Bend,
Allendale, N.J. 07401
Filed Mar. 2, 1967, Ser. No. 628,203
Int. Cl. B01d 49/00; B03c 1/30
U.S. Cl. 209—39                                    27 Claims

ABSTRACT OF THE DISCLOSURE

In a screw conveyor, the material moves in the upstream portion of an input compartment downward along its front end wall forming a partition toward a main screw, then under that partition and through the downstream portion of the input compartment, past its removal section for foreign material, to the main screw and its housing. For fluidization, the input compartment is provided with means for introducing a gas which is withdrawn through means provided in the top of the input compartment and in the housing. The input compartment is provided with magnetic means to pull and retain magnetic particles in the removal section. Sensing means selected from those based on electricity, magnetism, and radiation are provided to detect foreign particles in the downstream portion of the input compartment.

The present invention relates to the field of conveying and feeding particulate materials, and more particularly to a screw or paddle conveyor wherein foreign particles, such as tramp metal, are removed from the feed material.

A conventional screw conveyor consists of a housing having a screw rotatably mounted therein. When foreign particles, like bolts, nuts, etc. have accidentally gotten in such screw conveyor apparatus, severe damage to the screw and its housing has resulted.

Many attempts have been made to remove tramp metal from the feed material. One approach is sifting the feed material through a screen or perforated plate before it enters the conveyor. This method works only with well flowing materials, while sticky, tacky or pasty materials are not suitable for this equipment. Furthermore, only such foreign particles can be screened out which are larger than the largest particle of the material to be processed. Very often the processed material particle size is large, as with rubber lumps, plastic pellets, ground chips, comminuted plastic film and therefore foreign particles of comparable size can still reach the screw and cause damage.

Another method is the use of a grate magnet above the feed throat. It is obvious that only ferro-magnetic material can be expected to be removed. The chemical and other industries, however, use to a great extent stainless steels, bronze, aluminum and other non-magnetic metals in their plants. Bolts, nuts, etc. made of these materials frequently come loose from up-stream equipment and get into the screw apparatus. Furthermore, with many materials magnetized bars obstruct the flow of material excessively and therefore cannot be used.

Still another method described in Kiesskalt U.S. Patent 2,148,205 provides a hollow space at the discharge end of the upper of two screws. Foreign particles having entered the upper screw are frequently caught during their travel along the entire length of the screw in the nip between the two counter-rotating screws thus causing severe damage, before they have a chance to reach the space provided for them at the downstream end of that screw.

Another attempt described in Goetz U.S. Patent 2,127,726 provides an escape for tramp metal on top of the screw housing, downstream of the feed throat. Besides the fact that at this point damage already has occurred, the heavy metal parts cannot be expected to travel upward against the law of gravity. Similar devices are described in Carter U.S. Patent 2,186,404, Guthrie U.S. Patent 2,225,215 and Nelson U.S. Patent 2,233,707. Although in the latter two patents a space is shown between the lower periphery of the conveyor screw and the bottom of the input compartment, the upper portion of the input compartment is in direct communication with the conveyor screw, with the result that foreign particles conveyed within the helical screw flights, and especially those coming down in the front part of the input compartment along its front end wall are moved to the screw housing where they cause damage either in the entrance area or further downstream. It is also obvious that at the start-up of the conveyor the space just mentioned is initially filled by material which remains there stagnant, and packed, without participating in the flow of material, with the result that this space is not available for depositing tramp metal.

Generally speaking, the present invention contemplates an improvement in a screw conveyor wherein conveyed material is fed to a main screw rotating in its housing. According to the inventive concept an input compartment with upstream and downstream portions is provided, the downstream portion communicating with the main screw and its housing; and this downstream portion includes at its bottom a removal section for foreign particles which is disposed below the main screw and its housing, so that material is conveyed from the upstream portion through the downstream portion of the input compartment past the removal section, and upward to the main screw and its housing.

Preferably the screw conveyor may have an input compartment wherein the upstream portion is located above the downstream portion.

Advantageously the screw conveyor may include an input compartment wherein the front end wall of its upstream portion is extended downward to form a partition toward the main screw, so that conveyed material passes from the upstream portion through the downstream portion of the input compartment, under the partition, past the removal section and to the main screw which forces the same through its housing.

Also the screw conveyor may be provided with a disc located at the upstream end of the main screw, the disc having a round cross-section being supplemented by the front end wall of the input compartment's upstream portion and its extensions, the clearances being smaller than the smallest permissible foreign particle.

Conveniently the screw conveyor may include a feed rotor which is disposed coaxially with the main screw and extends through the input compartment.

The screw conveyor may also be provided with an input compartment, the downstream portion thereof having means for introducing air or other gases into the material conveyed therein, and with means for withdrawing air and gases.

The invention and other features, objects and advantages will be apparent from the following description taken in connection with the accompanying drawings in which.

Figure 1:
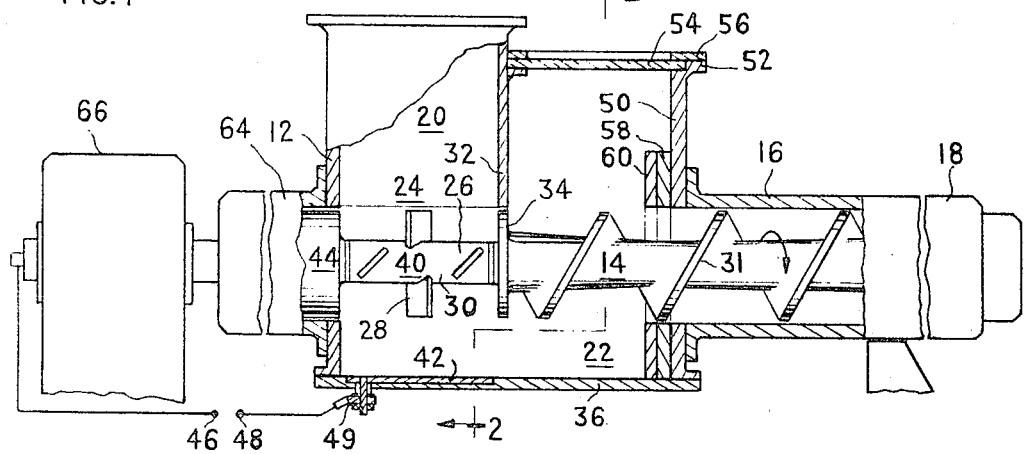
FIGURE 1 is an elevation, partly in section, of one embodiment of the invention.
Figure 4:
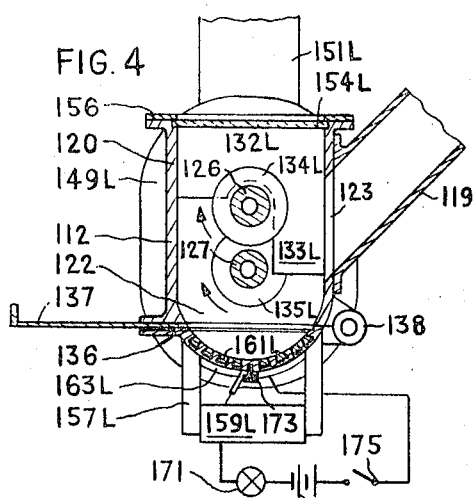
Figure 3:
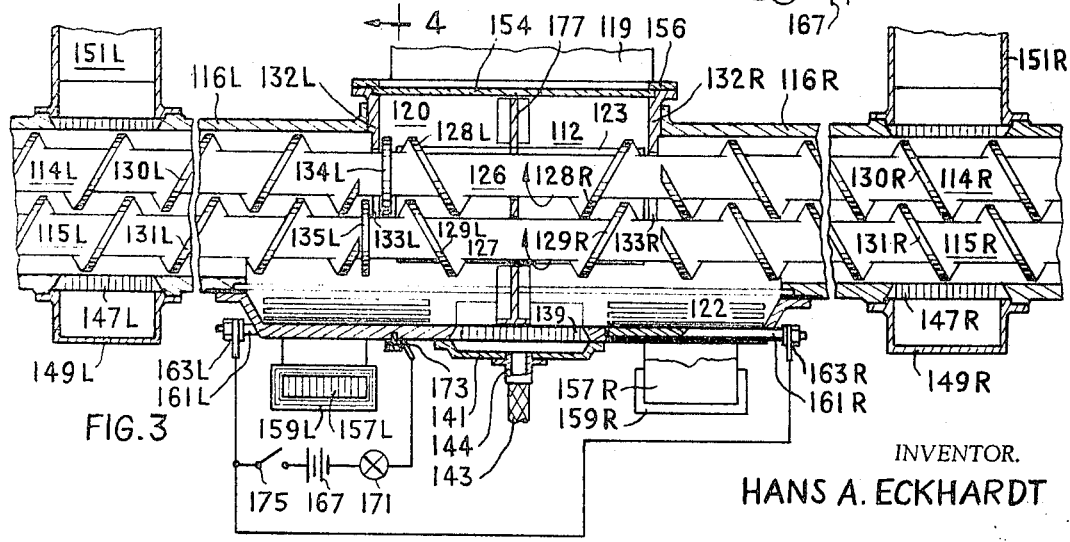
FIGURE 3 illustrates a longitudinal section similar to FIGURE 1 of another embodiment of the invention.

FIGURE 4 likewise shows a cross-sectional view along lines 4—4 of FIGURE 3;

FIGURE 5 presents still another embodiment shown in a longitudinal section similar to FIGURE 1;

FIGURE 6 depicts a cross-sectional view of the embodiment of FIGURE 5 along the lines 6—6 thereof;

FIGURE 7 shows a longitudinal section of yet another embodiment of the invention;

FIGURE 8 is a cross-sectional view of FIGURE 7 along the lines 8—8 thereof;

FIGURE 9 portrays a longitudinal section of still another embodiment of the invention, while FIGURE 10 is a cross-sectional view along lines 10—10 of FIGURE 9.

Figure 2:
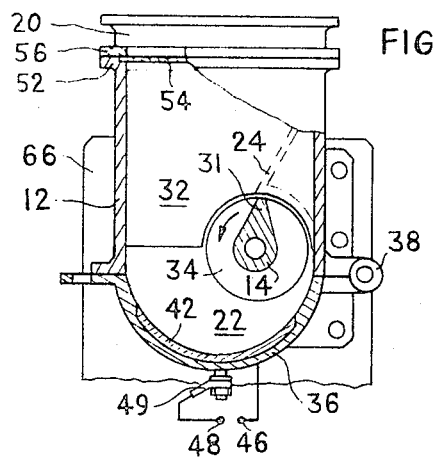
FIGURE 2 shows a cross-sectional view along the lines 2—2 of FIGURE 1.

Referring to the drawings, wherein for the purpose of illustration are shown various embodiments of the invention, FIGURES 1 and 2 show a conveyor apparatus which includes an input compartment 12 and a main screw 14 carrying material through a screw housing 16 to a discharge zone 18. Material is conveyed from the upstream portion 20 of input compartment 12 into the downstream portion 22 thereof, while the baffle 24 directs the material only to that side of the feed rotor 26 on which it is pushed downward, at the same time being moved in a downstream direction through the downstream portion 22 toward main screw 14 which forces the material into and through housing 16. Feed rotor 26 is shown as having its flights interrupted thus forming paddles 28 between blank shaft sections 30 of feed rotor 26.

The front end wall 32 of the input compartment's 12 upstream portion 20 is extended downward to supplement a disc 34 located at the upstream end of main screw 14 separating the same from feed rotor 26. Disc 34 has a round cross-section and a radial clearance to the extended front end wall 32, which clearance is smaller than the smallest permissible foreign particle.

The conveyed material passes under extended front end wall 32 and disc 34 past a removal section 36 to the main screw 14 which forces it downstream and through housing 16 to discharge zone 18. The heavier foreign particles are unable to follow this travel due to their greater specific gravity and remain below in downstream portion 22. They separate from the conveyed material and accumulate in removal section 36 which is mounted by a hinged connection 38 for quick detachment and fast removal.

To detect foreign particles in downstream portion 22 of input compartment 12, feed rotor 26 carries one pole 40 and removal section 36 the other pole 42 of a capacitor, the capacitance thereof being changed by foreign particles within downstream portion 22. Pole 40 is electrically connected through drive shaft 44 with one terminal 46 of an instrument (not shown) indicating or signalling a change in capacitance, the other terminal 48 thereof being connected with pole 42 and the terminal 49 thereof. While in this embodiment a device indicating a change in capacitance is shown, it is understood that any other sensing means based on principles of electricity, magnetism, or radiation may be employed, one pole of these sensing means carried by feed rotor 26 or main screw 14, and the other pole being carried by downstream portion 22, to detect foreign materials within downstream portion 22. It is further understood that one pole of such sensing means may be mounted on one part of input compartment 12, and the other pole mounted on another part of input compartment 12, so that foreign particles getting between these poles change the electric, magnetic or radiant fields respectively, and can thus be detected.

Pole 42 is shown as being located in the upstream part of removal section 36, to provide space in the downstream part thereof for the later addition of means for introducing air or other gases, as described in detail with other embodiments, should a process to be performed call for such measures. Therefore it is understood that pole 42 may be located in the downstream part, or may extend over the full length of removal section 36, with the opposite pole 40 then extending over that length of main screw 14 which is located within input compartment 12.

Downstream portion 22 of input compartment 12 is shown as having a front end wall 50 with a flange 52 into which is inserted a glass or otherwise transparent plate 54 held in place by flange 56. This arrangement permits to observe the conveyance of material through downstream portion 22, provides space for the later addition of means for withdrawing air and other gases, as described in detail with other embodiments, and makes possible to put in place the baffles 58 and 60.

Baffles 58 and 60 have interior surfaces conforming to the interior surface of housing 16. They are fastened to front end wall 50 of input compartment's 12 downstream portion 22, to decrease the flow of material through the conveyor without using a variable speed drive; by detaching baffle 58 or baffle 60 or both, or by replacing them with baffles of smaller width, the throughput of the conveyor can be increased.

The throughput of the conveyor can be steplessly varied, without using a stepless variable speed drive which is expensive, by having main screw 14 with disc 34 located at the upstream end thereof moveable along its axis relative to input compartment 12. Main screw 14 is shown in its extreme upstream position. By moving main screw 14 downstream, the flow of material is not only decreased by diminishing the flow cross-section of the downstream portion 22, but in addition by exposing smaller flight volumes of main screw 14. Vice versa, by moving main screw 14 upstream, the flow of material is increased by enlarging the flow cross-section of downstream portion 22 as well as by exposing larger flight volumes of main screw 14 to the conveyed material. The flight volume of main screw 14 is shown as increasing within input compartment 12 in downstream direction by an increase in flight depth, but it is understood that a larger flight volume can also be obtained by a larger screw pitch or by a combination of these two measures.

Main screw 14 has been described as being moveable along its axis, but it is understood that input compartment 12 may be moveable along the axis of main screw 14 as well, as the relative movement is of importance.

Main screw 14 and disc 34 located at its upstream end are shown as being coaxially connected to feed rotor 26, the drive shaft 44 thereof extending through rear screw housing 64 into gear box 66 supplying the drive torque. It is understood that main screw 14 with its disc 34 may be separated from feed rotor 26 and drive shaft 44 and moved by drive means (not shown) located at the far downstream end of main screw 14 near discharge zone 18. Such an arrangement is advantageous when in the downstream part of main screw 14 and housing 16 operations under high torque, pressure, and/or temperature are to be performed.

As shown in FIGURE 2 main screw 14 and feed rotor 26 have a horizontal radial distance from that side of input compartment 12 on which the screw flights 31 move downward, and a vertical radial distance measured below main screw's 14 centerline to removal section 36, and a radial distance at least along all intermediate points of that quadrant of at least 12 percent of the outside diameter of main screw 14.

So called offset throats, the vertical axis of which is offset by a horizontal distance from the horizontal axis of the screw are well known in the industry and shown in Royle U.S. Patent 1,645,157, Hale U.S. Patent 2,319,859, Gray U.S. Patent 2,547,000, and Lorenian U.S. Patent 3,065,502. However, they have no or a negligible vertical radial distance measured below the main screw's centerline to the bottom of the input compartment, with the result that tramp metal frequently jams at the screw flights where they approach the input compartment. In contrast, in the embodiment shown in FIGURE 2, foreign particles separate downward and accumulate at removal section 36, without any tendency of being caught between the flights 31 of main screw 14 and input compartment 12.

In the embodiments of FIGURES 3 and 4, the screw conveyor includes an input compartment 112 and two main screws 114 R and L, 115 R and L, which are parallel and intermeshing and which are rotatably mounted in their housings 116 R and L. The material is conveyed from a chute 110 through an upstream portion 120 of input compartment 112 into a downstream portion 122 thereof communicating with main screws 114 R and L, 115 R and L and their housings 116 R and L.

In and extending through input compartment 112, the feed rotors 126, 127 are disposed rotatably and coaxially with main screws 114 R and L, 115 R and L. The helical flights 128 R and L, 129 R and L, of feed rotors 126, 127 are disposed in opposite direction to the flights 130 R and L, 131 R and L of main screws 114 R and L, 115 R and L and therefore move the material coming through the opening 123 not only in a downward direction but also toward the center of input compartment 112. Thus the material is moved away from the front end walls 132 R and L of input compartment's 112 upstream portion 120 which are extended downward to form partitions 133 R and L toward main screws 114 R and L, 115 R and L, so that conveyed material passes from upstream portion 120 through downstream portion 122 of input compartment 112, under partitions 133 R and L, upward to main screws 114 R and L, 115 R and L and their housings 116 R and L.

Because of this movement away from partitions 133 R and L, discs 134 L and 135 L are shown as being located at the upstream ends of main screws 114 L, 115 L only, while at the upstream ends of main screws 114 R, 115 R the corresponding discs are dispensed with. The discs 134 L and 135 L have a round cross-section and are supplemented by the partition 133 L, the clearances being smaller than the smallest permissible particle.

At the bottom of input compartment 112 is located a removal section 136 for foreign particles, the removal section 136 being disposed below main screws 114 R and L, 115 R and L and their housings 116 R and L, so that material is conveyed from upstream portion 120 through downstream portion 122 of input compartment 112 past that removal section 136 and upward to main screws 114 R and L, 115 R and L and their housings 116 R and L. Removal section 136 is shown as being mounted by a hinged connection 138 for quick detachment and fast removal of accumulated foreign particles.

Above removal section 136 is provided a slide valve 137 which permits in its closed position the quick detachment of removal section 136 and the fast removal of accumulated foreign particles, without interrupting the conveyance of materials.

Input compartment 112 is provided in its removal section 136 with means of introducing air or other gases into the material conveyed therein, including a porous plate 139 which can be made of ceramics, sintered metals or other materials. Plate 139 forms together with casing 141 a chamber into which air or other gases are supplied through a hose 143 with hose terminal 145. Instead of hose 143 a duct with a larger cross-section may be used, if larger gas volumes are to be moved with less flow resistance.

The gas is introduced with such a flow rate that it aerates the conveyed material which thereby obtains flow properties similar to a liquid and thus flows easily under partitions 133 R and L and discs 134 L, 135 L and upward into the main screws 114 R and L, 115 R and L.

While various amounts of gas may be introduced, it is often advantageous to choose the state of incipient fluidization where the material particles become disengaged and the material is just suspended without separation of fines and dust development.

The screw conveyor with the described means for introducing gases may also be used for letting seep hot gases, preferably desiccated, into the conveyed material for heating and drying purposes. In contrast the hopper dryers and hopper feeders known in the industry introduce air far above the main screw and therefore lose the height of the input compartment and of the lower hopper area for drying or heating purposes. In addition they worsen the flow conditions in the hopper by inserting conical spreaders that become necessary with the inlet of air on the side.

The apparatus as herein described may also be applied for introducing gases to carry out chemical reactions, such as calcining, roasting and others. In turn the above means for introducing gases may also be utilized for preventing undesirable chemical reactions by letting seep into the conveyed material inert gases such as nitrogen, or for a cooling effect by using cold, preferably dehumidified gases. It is understood that among other gases hot or cold, dry or moist air will be widely used in the described apparatus.

In the hopper dryers and hopper feeders known in the industry the introduced gases are usually removed on the upper end of the hopper which is mounted on top of the input compartment, through a hose by a blower supplying the needed negative pressure. While this method can be used with the described conveyor apparatus, there are more advantageous ways available.

One way is to carry the introduced gas with main screws 114 R and L, 115 R and L to the discharge zones (not shown), if this is desirable in a conveying operation. In another preferred embodiment of this invention, the housings 116 R and L are provided with means for withdrawing gases. These means are shown as including porous plates 147 R and L, their interior surfaces conforming to those of housings 116 R and L, and casings 149 R and L which form ducts 151 R and L at their top, leading to a negative pressure source (not shown) such as a blower.

These means for withdrawing gases permit the degassing of the conveyed material to practically any desired degree. It is possible to withdraw gases from the conveyed material to such an extent that it contains only a fraction of the amount of gas contained in its original condition.

It has been found that this arrangement is far more efficient than precompression or charging screws which are well known in the industry, usually mounted in a vertical position extending through the feed hopper into the input compartment and which displace a limited amount of gas by cramming the material under increased pressure into the main screw. This equipment frequently causes difficulties, since it packs the material into a brick-like consistency which has lost many of its desirable flow properties and often overloads the main screw excessively. The conveyor in accordance with the inventive concept permits to load the main screw to practically any desirable amount of torque. Frequently it is desirable to operate the screw conveyor at full nominal torque at which the screw conveyor including its drive operates at optimum efficiency.

The screw conveyor is shown as having input compartment 112 provided on its top with a transparent cover 154 so as to observe the flow of material. Transparent cover 154, mostly a plate of glass or transparent plastic material which is held in place by flange 156, permits to control the rate of gas to the desired degree of incipient, or dense, or dilute fluidization.

The fluidization causes to separate from the conveyed material even such foreign particles which have a specific gravity close to that of the conveyed material. To insure that magnetic foreign particles with large surfaces, such as lathe shavings, are not carried with the conveyed material, downstream portion 122 of input compartment 112 is provided with magnetic means to pull and retain magnetic particles in removal section 136. The magnetic means include the magnets 157 R and L which are shown as having windings 159 R and L, although windings 159 R and L may be omitted, if permanent magnets 157 R and L are used. It is preferable to have removal section 136 and other parts of input compartment 112 made of non-magnetic materials to direct the magnetic field in the most advantageous spaces.

The screw conveyor has embedded in removal section 136 and insulated therefrom metallic inserts 161 R and L which are in contact with the conveyed material and which are electrically connected via their terminals 163 R and L with each other and one pole of an electric energy source 167, of which the other pole is connected via current indicating means 171 to removal section 136 with terminal 173. If electrically conductive particles, such as metallic bodies, accumulate in removal section 136, they will form an electrically conductive connection on one or more spots between inserts 161 R and L and the balance of removal section 136 interior surface, this closing the loop and actuating current indicating means 171 which may be a warning light, a horn, a siren or others. The device is ready for operation after switch 175 is closed.

In this embodiment of the invention, there are two main screws 114 R, 114 L and one feed rotor 126 all on one axis, while the two main screws 115 R, 115 L and one feed rotor 127 are all on one other axis, the feed rotors 126, 127 being in the center. In many cases it is advantageous to provide an input compartment 112 which includes a partition 177 dividing the upstream and downstream portions 120, 122 of input compartment 112 into two halves, with one half of each feed rotor 126, 127 disposed in each one of the two halves. Such an arrangement is of advantage if the material is to be treated differently in the left half than in the right half. For example, at a given number of revolutions of main screws 114 R and L, 115 R and L, the throughput through main screws 114 L, 115 L can be varied from that of main screws 114 R, 115 R by withdrawing an amount of gas through duct 151 L different from that through duct 151 R.

In each of the two halves of the screw conveyor can be conveyed a different material, if in addition chute 119 and opening 123 are partitioned leading to different sources of material supply.

FIGURES 5 and 6 show an embodiment of the screw conveyor, wherein conveyed material is fed to the two parallel main screws 214, 215 which are mounted rotatably and adjacent to each other in their housing 216. The input compartment 212 has an upstream portion 220 and a downstream portion 222, the downstream portion 222 communicating with main screws 214, 215 and their housing 216. At the bottom of downstream portion 222 is located a removal section 236 disposed below main screws 214, 215 and their housing 216, so that the material is conveyed from upstream portion 220 through rownstream portion 222 of input compartment 212 past the removal section 236 and upward to main screws 214, 215 and their housing 216. Input compartment 212 feed rotors 226, 227 are disposed rotatably and coaxially with main screws 214, 215.

Input compartment 212 is provided in its upstream portion 220 with means for introducing air or other gases into the material conveyed therein, including a porous annular plate 239 and a casing 241 which together form a chamber into which air and other gases are supplied through duct 243.

In housing 216 means are provided for withdrawing gases, including a porous plate 247 and a casing 249 which together form a chamber from which air and other gases are withdrawn through duct 251.

Input compartment 212 is provided on its top with a transparent cover 254 so as to observe the flow of material. Cover 254 may consist of glass, transparent plastic or other suitable material.

Removal section 236 is mounted to input compartment 212 by a hinged connection 238 for quick detachment and fast removal of accumulated foreign particles.

In removal section 236 are embedded and insulated therefrom electrically conductive inserts 261 which are in contact with the conveyed material and which are electrically connected via their terminals 263 with each other and via current indicating means 271 with one pole of an electric energy source 267, the other pole of which is connected to removal section 236 with a terminal 273. If electrically conductive foreign particles accumulate in removal section 236, they will form an electrically conductive connection on one or more locations between inserts 261 and the balance of removal sections 236 interior surface, thus closing the loop and actuating current indicating means 271, such as a warning light which can be turned off by a switch 275 as shown.

FIGURES 7 and 8 show an embodiment of the screw conveyor wherein conveyed material is fed to two parallel main screws 314, 315 which are mounted rotatably and adjacent to each other in their housing 316. The input compartment 312 has an upstream portion 320 and a downstream portion 322, the downstream portion 322 communicating with main screws 314, 315 and their housing 316. At the bottom of downstream portion 322 is located a removal section 336 disposed below main screws 314, 315 and their housing 316, so that the material is conveyed from upstream portion 320 to downstream portion 322 past removal section 336 and upward to main screws 314, 315 and their housing 316.

At the upstream end of main screw 314 a disc 334 is located, and at the upstream end of main screw 315 a disc 335. Each disc 334, 335 having a round cross-section is supplemented by the front end wall 332 of input compartment's 312 upstream portion 320 and its extensions, the clearances being smaller than the smallest permissible foreign particle.

In and extending through input compartment 312, feed rotors 326, 327 are disposed rotatably and coaxially with main screws 314, 315 and are driven by drive shafts 344 rotating in rear screw housing 364. Feed screws 326, 327 have located pins or rods 328 between blank shaft sections 330, said pins being shown as having round cross-sections and extending radially. It is understood that feed rotors 326, 327 may instead have continuous or interrupted (paddles) flights, as shown in various other embodiments.

Since the feed rotors 326, 327 are shown as rotating toward each other at the top, a diverter 324 is provided which prevents foreign particles from getting between the feed rotors 326, 327, and which feeds the material downward at the sides, between feed rotors 326, 327 and input compartment 312. If the flow properties of the material do not permit the use of such a diverter 324, pins 328 having high elasticity and preferably smaller cross-sections than shown are applied, or they may be omitted entirely.

Input compartment 312 is provided with means for introducing air or other gases into the material conveyed therein. These means include a porous plate 339 and a casing 341, together forming a chamber into which air or other gases flow from a hose 343 with a terminal 345.

There are also provided means for withdrawing air or other gases at the housing 316 of main screws 314, 315. These means consist of a porous plate 347 of oblong annular cross-section conforming to the cross-section of housing 316, and a casing 349 which together form a chamber from which air or other gases are withdrawn through duct 351.

Removal section 336 is mounted by a hinged connection 338 for quick detachment and fast removal of accumulated foreign particles.

Also in input compartment 312, removal section 336 is provided with magnetic means to pull and retain magnetic foreign particles in the removal section 336. The magnetic means include a magnet 357 which is shown as having a primary winding 359, although this may be omitted if a permanent magnet 357 is used. It is preferable to have removal section 336 and other parts of input compartment 312 made of non-magnetic materials to direct the magnetic field in the most advantageous spaces.

In this embodiment the magnetic means are shown as including primary winding 359 and a secondary winding 360 into which is induced a voltage increased by foreign particles changing the magnetic field, the increased voltage being used for indicating and signaling the accumulation of such foreign particles, e.g., by a volt-meter 362 with a maximum contact for a warning light, horn, or siren. Primary winding 359 is usually supplied with a constant A.C. voltage through terminals 363.

The magnetic means shown is this embodiment include a laminated iron core 365 which forms part of the surface of input compartment's 312 downstream portion 322 being in contact with the conveyed material, the laminated iron core 365 having the even numbers of insulated iron layers electrically connected with each other, with removal section 336, and with one pole of an electric energy source 367, the other pole of which is connected via current indicating means 371 with the odd numbers of the insulated iron layers.

In FIGURES 7 and 8, laminated iron core 365 forms part of the interior surface of removal section 336 wherein each iron layer is electrically insulated against the two next adjacent iron layers and against removal section 336, but non-insulated against and in contact with the conveyed material. The second, fourth, sixth, eighth, tenth, etc. layers of the insulated iron core are electrically connected with each other at terminal 368, with removal section 336 by terminal 373, and via a warning light 371 with one pole of a battery 367. The other pole thereof is connected via a switch 375 with terminal 376 which electrically connects the first, third, fifth, seventh, ninth layers of the iron core 365.

If conductive foreign particles such as metallic bodies accumulate in removal section 336 they will form an electrical connection on one or more spots between the first, third, fifth, seventh, ninth, etc. layers of the iron core 365 on one side, and the second, fourth, sixth, eighth, tenth, etc layers, as well as the removal section 336 on the other side of the electric energy source 367. A current will start to flow through the current indicating means 371 which may include a warning light, a horn, a siren or other signal devices. Of course, the current indicating means 371 as well as switch 375 may be placed in the loop on either side of the electric energy source 367 which may be a secondary winding on the electro-magnet 357, instead of the battery 367. It is also obvious that laminated iron core 365 preferably consists of an old number of insulated iron layers.

Principally the screw conveyor may have one pole of sensing means mounted on one location, and the other pole on another location in the input compartment 312 so that foreign particles in the input compartment are detected by their changing the magnetic, electric or radiant field between the poles of such sensing means which are based on principles of magnetism, electricity or radiation.

In this and other embodiments the axes of main screws 314, 315 and of their housing 316 are shown as being horizontal. It is understood that the axes of the main screws and their housing may be inclined against the horizontal plane with any angle of up to 90° without deviating from the principles of this invention.

FIGURES 9 and 10 show an embodiment of the screw conveyor wherein conveyed material is fed to two main screws 414 R and L rotatably mounted in their housings 416 R and L. The input compartment 412 has an upstream portion 420 and a downstream portion 422, the upstream portion 420 located above the downstream portion 422 communicating with main screws 414 R and L and their housings 416 R and L.

At the bottom of input compartment 412 is located a removal section 436 disposed below main screws 414 R and L and their housings 416 R and L so that the material is conveyed from upstream portion 420 through downstream portion 422 past removal section 436 and upward to main screws 414 R and L and their housings 416 R and L.

At the upstream end of main screw 414 R a disc 434 R is located and at the upstream end of main screw 414 L a disc 434 L. Each disc 434 R, 434 L having a round cross-section is supplemented by the front end walls 432 R and L respectively and their extensions, the clearances being smaller than the smallest permissible foreign particle.

In input compartment 412 a feed rotor 426 is disposed rotatably and coaxially with main screws 414 R and L, all on one axis, the feed rotor 426 being in the center. Feed rotor 426 has paddles 428 located between blank shaft sections 430, representing helical flights interrupted in intervals. Main screws 414 R and L may also have discontinuous screw flights shown here in the form of paddles 429, over at least part of their length.

When screws 414 R and L and feed rotor 426 are rotated as indicated by the solid arrow, counter-clockwise in FIGURE 10, the material is conveyed in the entire screw conveyor to the right side of FIGURE 9. When the sense of rotation is reversed as per dotted arrow, the conveying direction is also reversed, to the left in FIGURE 9. As a result, the screw conveyor permits to feed from a central source of material above input compartment 412 in either of two opposite directions by just reversing the sense of screw rotation, without changing the location of equipment.

Removal section 436 is mounted to input compartment 412 by a hinged connected 438 for quick detachment and fast removal of accumulated foreign particles. Above removal section 436 is provided a slide valve 437 which permits in its closed position the quick detachment of removal section 436 and the fast removal of accumulated foreign particles, without interrupting the conveyance of material.

Input compartment 412 is provided with means for introducing air or other gases into the material conveyed therein, including in removal section 436 a porous plate 439 made of ceramics, sintered metals or other materials. Plate 439 forms together with casing 441 a chamber into which air or other gases are supplied through a hose 443 with a hose terminal 445.

Housings 416 R and L are provided with means for withdrawing air and other gases, including porous plates 447 R and L, their interior surfaces conforming to those of housings 416 R and L, and casings 449 R and L with ducts 451 R and L leading to a negative pressure source (not shown) such as a blower.

To pull and retain magnetic particles in removal section 436, downstream portion 422 of input compartment 412 is provided with magnetic means comprising magnets 457 R and L which are shown as having primary windings 459 R and L with terminals 463 R and L connected to a constant voltage source (not shown).

Foreign particles increasing the magnetic field in downstream portion 422 cause an increase in the voltage induced into a secondary winding 460 R and L, the increased voltage being used for indicating and signaling the accumulation of such foreign particles by a volt-meter 462.

The magnetic means also include laminated iron cores 465 R and L which form part of the interior surface of removal section 436 being in contact with the conveyed material, the laminated iron cores 465 R and L having the even numbers of their insulated iron layers electrically connected with each other at terminals 468 R and L, with removal section 436 via terminal 473, and via a switch 475 with one pole of a battery 467. The odd numbers of insulated iron layers are electrically connected with each other at terminals 476 R and L, and the other pole of battery 467 via a warning light 471.

Although the present invention has been described in conjunction with various embodiments, it is to be understood that modifications and variations may be resorted to without departing from the spirit and scope of the invention as those skilled in the art will readily understand. Such modifications and variations are considered to be within the purview and scope of the invention and appended claims.

Since hardly all elements of the present invention could be shown in one embodiment, the various embodiments include only a number of such elements in combination. It is to be understood that these combinations can be varied by including a different element of the invention and excluding another.

In various embodiments there are more elements of the invention shown than are necessary for performing certain operations. This is based on the fact that it is always possible to delete an additional element after it has been illustrated and described, while there is no acknowledged method to suggest a possible addition of elements without having shown and described them beforehand.

I claim:
1. I a screw conveyor wherein material is fed to a main screw rotatably mounted in a housing thereof, the improvement therein comprising
an input compartment having an upstream portion with a front end wall extending downward and forming a partition toward the input compartment's downstream portion and toward the main screw, the upstream portion communicating through the downstream portion with the main screw and the housing thereof;
a removal section for foreign particles in the lower part of the input compartment disposed below the main screw and the housing thereof;
so that the material passes from the upstream portion under the partition, past the removal section, through the downstream portion of the input compartment and to the main screw and the housing thereof.

2. A screw conveyor as claimed in claim 1, wherein the main screw has at its end extending toward the upstream portion a round cross section supplementing the front end wall of the input compartment's upstream portion and its extensions, the clearance being smaller than the smallest permissible foreign particle.

3. A screw conveyor as claimed in claim 1 wherein the input compartment is provided with means for introducing a gas into the material conveyed therein.

4. A screw conveyor as claimed in claim 1 wherein the input compartment is provided on its top with means for withdrawing gas.

5. A screw conveyor as claimed in claim 1 wherein the input compartment is provided on its top between the front end wall of the upstream portion and the front end wall of the downstream portion with a transparent cover so as to observe the flow of material.

6. A screw conveyor as claimed in claim 1 wherein the housing of the main screw is provided with means for withdrawing gas.

7. A screw conveyor as claimed in claim 1 wherein there are embedded in the removal section and insulated therefrom metallic inserts which are in contact with the conveyed material and which are electrically connected with each other and one pole of an electric energy source, the other pole of which being connected via current indicating means to the removal section.

8. A screw conveyor as claimed in claim 1 wherein the main screw is movable along its axis relative to the input compartment, and has a flight volume changing along its length within the input compartment, increasing the flow of material by exposing larger flight volumes of the main screw to the conveyed material, decreasing the flow of material by exposing smaller flight volumes.

9. A screw conveyor as claimed in claim 1 wherein baffles having interior surfaces conforming to the adjacent cylindrical interior surface of the housing, are fastened to the front end wall of the input compartment's downstream portion, to decrease the flow of material, and are removed to increase the flow of material.

10. A screw conveyor as claimed in claim 1 wherein there are at least two parallel main screws mounted rotatably and adjacent to each other in their housings.

11. A screw conveyor as claimed in claim 1 wherein the axis of the main screw and of its housing are inclined against the horizonal plane with an angle of up to ninety degrees.

12. A screw conveyor as claimed in claim 1 wherein one pole of sensing means selected from those based on principles of magnetism, electricity and radiation is mounted on one location, and the other pole of said sensing means is mounted on another location of the input compartment so that foreign particles changing the magnetic, electric and radiant field respectively between said poles are detected.

13. A screw conveyor as claimed in claim 1 wherein the removal section is mounted by a hinged connection for quick detachment and fast removal of accumulated foreign particles.

14. A screw conveyor as claimed in claim 13 wherein a slide valve is provided above the removal section, the slide valve permitting in its closed position the quick detachment of the removal section and the fast removal of accumulated foreign particles, without interrupting the material conveyance.

15. A screw conveyor as claimed in claim 1 wherein the downstream portion of the input compartment is provided with magnetic means to pull and retain magnetic particles in the removal section.

16. A screw conveyor as claimed in claim 15 wherein the magnetic means include a primary winding which induces into a secondary winding a voltage increased by foreign particles changing the magnetic field, the increased voltage being used for indicating and signaling the accumulation of such foreign particles.

17. A screw conveyor as claimed in claim 15 wherein the magnetic means include a laminated iron cord which forms part of the surface of the input compartment's downstream portion being in contact with the conveyed material, the laminated iron core having the even numbers of insulated iron layers electrically connected with each other, with the removal section, and with the one pole of an electric energy source, the other pole of which is connected via current indicating means with the odd numbers of the insulated iron layers.

18. A screw conveyor as claimed in claim 1 wherein there are at least two main screws and one feed rotor all on one axis, the feed rotor being in the center.

19. A screw conveyor as claimed in claim 18 wherein the input compartment includes a partition dividing the upstream and downstream portions thereof into two halves, with one-half of the feed rotor being disposed in each part.

20. A screw conveyor as claimed in claim 1 wherein a feed rotor is disposed rotatably in the input compartment.

21. A screw conveyor as claimed in claim 20 wherein the feed rotor has helical flights interrupted in intervals, so as to form paddles, rods or pins located between blank shaft sections.

22. A screw conveyor as claimed in claim 20 wherein the feed rotor carries one part, and the downstream portion of the input compartment another part of sensing means selected from those based on principles of magnetism, electricity, and radiation, to detect foreign particles in the downstream portion.

23. A screw conveyor as claimed in claim 20 wherein the feed rotor in the input compartment is disposed coaxially with the main screw.

24. A screw conveyor as claimed in claim 23 wherein the feed rotor has helical flights disposed at least partially in opposite direction to the flights of the main screw.

25. A screw conveyor as claimed in claim 23 wherein the main screw and the feed rotor have a horizontal radial distance from that side of the input compartment on which the screw flights move downward, and a vertical radial distance measured below the main screw center line to the removal section, and a radial distance along all intermediate points of that quadrant being larger than the radial distances along all points in the quadrant following in the direction of screw rotation.

26. In a screw conveyor wherein conveyed material is fed to a main screw rotatably mounted in its housing, the improvement therein comprising
an input compartment having an upstream portion and a downstream portion, the downstream portion communicating with the main screw and its housing;
a removal section for foreign particles located at the bottom of the input compartment's downstream portion, the removal section disposed below the main screw and its housing;
a front end wall of the input compartment's upstream portion extending downward to form a partition toward the main screw, so that conveyed material passes from the upstream portion through the downstream portion of the input compartment, under the partition past the removal section, and upward to the main screw and its housing.

27. In a screw conveyor wherein conveyed material is fed to a main screw rotatably mounted in its housing, the improvement therein comprising
an input compartment having an upstream portion and a downstream portion, the downstream portion communicating with the main screw and its housing;
a removal section for foreign particles located at the bottom of the input compartment's downstream portion, the removal section disposed below the main screw and its housing;
a disc located at the upstream end of the main screw, the disc having a round cross section being supplemented by a front end wall of the input compartments upstream portion and its extensions, the clearances being smaller than the smallest permissible foreign particle,
so that conveyed material passes from the upstream portion under the front end wall and the disc, past the removal section, through the downstream portion to the main screw and its housing.

References Cited

UNITED STATES PATENTS

| | | | |
|---|---|---|---|
| 233,324 | 10/1880 | Caldwell | 198—229 X |
| 1,134,600 | 4/1915 | Filson | 198—64 |
| 1,703,465 | 2/1929 | Woodhead | 198—64 |
| 1,837,069 | 12/1931 | Rieger | 198—64 |
| 2,290,930 | 7/1942 | Wurzbach | 324—41 |
| 2,352,749 | 7/1944 | Wills | 198—213 X |
| 2,452,249 | 10/1948 | Leiske | 198—64 X |
| 2,455,750 | 12/1948 | Freed | 198—64 |
| 2,556,392 | 6/1951 | Hawk | 198—213 |
| 2,869,074 | 1/1959 | Clapp | 324—41 |
| 2,951,693 | 9/1960 | Carothers | 198—213 X |
| 2,963,086 | 12/1960 | Green | 198—64 X |
| 3,033,369 | 5/1962 | Kragle | 209—223 |
| 3,227,264 | 1/1966 | Best | 198—64 X |

FOREIGN PATENTS

| | | |
|---|---|---|
| 160,499 | 1/1955 | Australia. |
| 298,659 | 2/1916 | Germany. |

TIM R. MILES, *Primary Examiner.*

U.S. Cl. X.R.

198—213, 232; 209—223, 225, 147; 222—413; 324—41